No. 689,318. Patented Dec. 17, 1901.
T. E. LEE.
SOLDERING IRON.
(Application filed July 13, 1901.)
(No Model.)
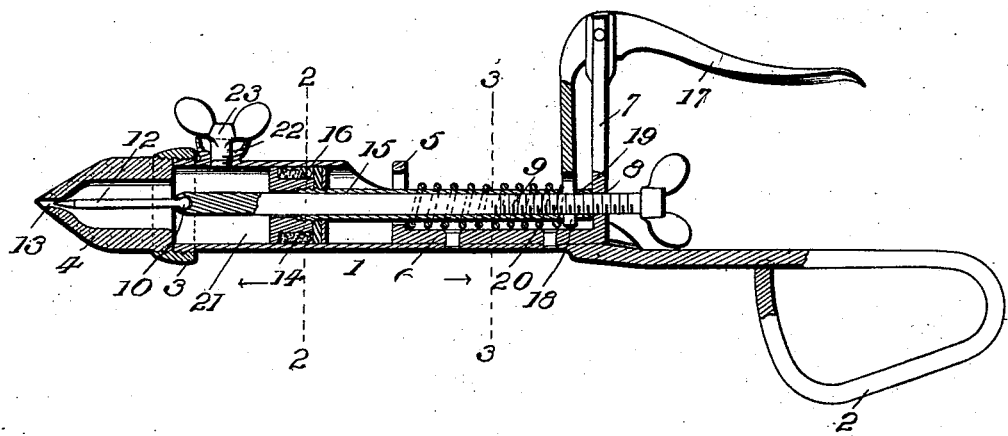
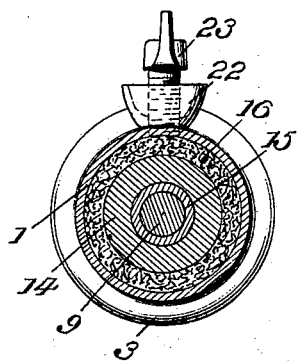
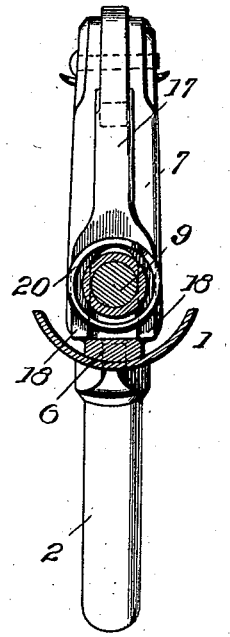
Inventor
Theodore E. Lee
Witnesses
By
Attorney

UNITED STATES PATENT OFFICE.

THEODORE E. LEE, OF LOWRY, MINNESOTA, ASSIGNOR OF THREE-FOURTHS TO IVER M. ENGEBRETSON, OF LOWRY, MINNESOTA.

SOLDERING-IRON.

SPECIFICATION forming part of Letters Patent No. 689,318, dated December 17, 1901.

Application filed July 13, 1901. Serial No. 68,180. (No model.)

*To all whom it may concern:*

Be it known that I, THEODORE E. LEE, of Lowry, in the county of Pope and State of Minnesota, have invented certain new and useful Improvements in Soldering-Irons; and I do hereby declare the following to be a full, clear, and exact description of the invention, such as will enable others skilled in the art to which it appertains to make and use the same.

This invention relates to soldering-irons, having special reference to those employing a cylinder or reservoir for holding the molten solder preparatory to its distribution.

The object of the invention is to provide improved means for controlling the feed-supply and means for ejecting the solder at the will of the operator in whatever position the tool may be placed.

The invention will be hereinafter fully set forth, and particularly pointed out in the claims.

In the accompanying drawings, Figure 1 is a vertical longitudinal sectional view. Figs. 2 and 3 are cross-sections on lines 2 2 and 3 3, respectively, Fig. 1.

Referring to the drawings, 1 designates a cylindrical body, 2 a handle secured to an elongated extension of such body, and 3 a ring forming a coupling between the cylindrical body and a hollow copper head or tip 4.

5 designates an eye extending from a supporting-strip 6, secured on the elongated extension of the cylinder. At its rear end this strip is formed with an upright post 7, bifurcated at its top and having a threaded opening 8. In the latter works a threaded rod 9, having its forward end extended well into cylinder 1 and constructed to form a knuckle-joint 10 with a pin 12, the pointed end of which latter projects into an opening 13 in head 4 to control the feed-supply. By turning rod 9 to move it and the pin 12 longitudinally the operator may control the feed of the solder. The object of the loose connection between rod 9 and pin 12 is to permit the latter to have sufficient lateral or vertical movement without throwing its point out of line with the opening 13.

14 designates the plunger by which the liquid solder is ejected. It comprises a hollow rod or spindle 15, inclosing a portion of rod 9, and a piston 16, preferably of asbestos. This piston is capable of being longitudinally reciprocated by means of a bell-crank lever 17, fulcrumed in the bifurcated end of post 7 and having its forked end 18 fitted in a recess 19 of spindle 15. A coil-spring 20, surrounding the spindle and bearing against fork 18 and eye 5, tends to normally hold the plunger in its retracted position—that is, at the inner end of the cylinder.

In practice the melted solder is poured into cylinder 2 through opening 22, which is then closed by plug 23, and the plunger being at one end of the cylinder and opening 13 closed by pin 12 the solder is retained as against leakage. The operator may then turn the screw-rod the desired extent to remove pin 12 from the outlet-opening and by pressing on handle 17 force the plunger inward, ejecting the solder and effecting a thorough application thereof at the desired point.

The advantages of my invention are apparent. It will be noted that in addition to the means for holding the melted solder I have provided a simple yet efficient device which, owing to the relative positions of its elements, is readily under the control of the operator for regulating the flow of the metal and effecting its discharge from the cylinder.

I claim as my invention—

1. A soldering-iron comprising a reservoir designed to contain melted solder, and having an outlet-opening, a screw-rod projecting into said cylinder, a pin loosely connected to said rod and designed to control said opening, and a plunger within said cylinder for effecting the discharge of solder therefrom, as set forth.

2. In a soldering-iron, the combination with a cylinder designed to contain melted solder and having an outlet-opening, of a spring-actuated plunger designed to effect the discharge of solder from said cylinder comprising a hollow rod or spindle, a piston thereon, and a rod passed through said spindle and piston for regulating the flow of metal through said outlet-opening, substantially as set forth.

3. In a soldering-iron, the combination with a cylinder designed to contain melted solder and having an outlet-opening at one end, a supporting-eye and a post, said post having a threaded opening, of a hollow spindle fitted in said eye and having a piston on its inner end, a coil-spring on said spindle between said post and said eye, an actuating-handle supported by said post for moving said sleeve as against the tension of the spring, a screw-rod passed through the threaded opening of said post and through said spindle and piston, and a pin for controlling said opening loosely connected to said rod, substantially as and for the purpose set forth.

4. In a soldering-iron, the combination with a cylinder designed to contain melted solder and having an outlet-opening, of a threaded rod, means connected to said rod for controlling said outlet-opening, a plunger having a hollow spindle through which said rod is passed, a post having a threaded opening for the rod, a lever fulcrumed on the post having a forked end engaging said spindle, an eye through which the spindle is passed, and a spring encircling said spindle and bearing against said eye and forked end of the lever, substantially as set forth.

In testimony whereof I have signed this specification in the presence of two subscribing witnesses.

THEODORE E. LEE.

Witnesses:
 WENSEL BORTER,
 AUGUST O. LYSIN.